United States Patent
Pooni et al.

(10) Patent No.: US 8,375,396 B2
(45) Date of Patent: Feb. 12, 2013

(54) BACKUP PROCEDURE WITH TRANSPARENT LOAD BALANCING

(75) Inventors: Subramaniyam V. Pooni, Roseville, CA (US); Anthony R. Silva, Antelope, CA (US); Jesus Urenda, Carpinteria, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1389 days.

(21) Appl. No.: 12/012,291

(22) Filed: Jan. 31, 2008

(65) Prior Publication Data

US 2009/0199199 A1 Aug. 6, 2009

(51) Int. Cl.
*G06F 9/46* (2006.01)

(52) U.S. Cl. ........................................... 718/105

(58) Field of Classification Search ............. 718/105; 707/204, 101
See application file for complete search history.

(56) References Cited

U.S. PATENT DOCUMENTS

| | | | |
|---|---|---|---|
| 7,055,008 B2 * | 5/2006 | Niles et al. | 711/162 |
| 7,275,050 B2 * | 9/2007 | Fujimoto | 711/100 |
| 7,555,531 B2 * | 6/2009 | Teodosiu et al. | 709/217 |
| 7,600,125 B1 * | 10/2009 | Stringham | 713/176 |
| 2003/0014478 A1 * | 1/2003 | Noble | 709/203 |
| 2005/0091234 A1 * | 4/2005 | Hsu et al. | 707/100 |
| 2008/0133561 A1 * | 6/2008 | Dubnicki et al. | 707/101 |
| 2008/0243879 A1 * | 10/2008 | Gokhale et al. | 707/100 |
| 2008/0270436 A1 * | 10/2008 | Fineberg et al. | 707/101 |
| 2009/0164529 A1 * | 6/2009 | McCain | 707/204 |
| 2010/0293141 A1 * | 11/2010 | Anand et al. | 707/640 |

\* cited by examiner

*Primary Examiner* — Thomas Lee
*Assistant Examiner* — Xuxing Chen (57) ABSTRACT

In an embodiment of the invention, an apparatus and method provides a backup procedure with transparent load balancing. The apparatus and method perform acts including: performing a preamble phase in order to determine if a file will be backed up from an agent to a portal; and applying a chunking policy on the file, wherein the chunking policy comprises performing chunking of the file on an agent, performing chunking of the file on the portal, or transmitting the file to the portal without chunking.

21 Claims, 11 Drawing Sheets

FIG. 9B    Portal Chunking

FIG. 10

BACKUP PROCEDURE WITH TRANSPARENT LOAD BALANCING

TECHNICAL FIELD

Embodiments of the invention relate generally to a backup procedure with transparent load balancing.

BACKGROUND

Data in a node that is connected to a communication network (e.g., WAN or LAN) can be backed up (i.e., mirrored) in another node that is also connected to the communication network. Incremental backup is often used in order to optimize the data backup procedure. Incremental backup involves only backing up files (or directories) that have been modified or added since the last backup, or backing up the modified chunks of a file if the chunk-based compare-by-hash technique is used. The chunks that are part of a file being backed up in a source node will be transmitted to the destination node, depending on the hash comparison results. In the chunking procedure, the file would be divided into chunks and a hash value is calculated for each chunk. For every file that is backed up the destination node maintains a list of hash chunk pairs that compose the file being backed up in a hash chunk database. During a subsequent incremental backup if the compared hash values in the hash chunk database for a file that was previously backed up on to the destination node differs, only the chunks that differ are transmitted to the destination node and the deltas are applied to the existing version of the file on the destination node and a new version of the file is created. For the cases where a file is being backed up to the destination node for the first time a heuristic resemblance detection method is used, where only the first few hashes of chunks in a file are compared with the hashes of chunks of other files that have already been stored on the destination node. If there is a match then the chunks that are being shared by the two files need not be transmitted from the source node to the destination node. Instead only the chunks that differ in the file that is being backed up needs to be transmitted. This procedure is called chunk level single instancing where chunks can be shared between unrelated files.

However, the chunking of files consumes significant resources (e.g., CPU cycles, memory spaces, I/O resources, and network bandwidth) in the source node, particularly if the files are large in sizes (e.g., large megabyte or gigabyte sizes) and/or are numerous in number. For example, the calculation of hash values will consume CPU cycles and require an amount of time to perform. Therefore, the current technology is limited in its capabilities and suffers from at least the above constraints and deficiencies.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
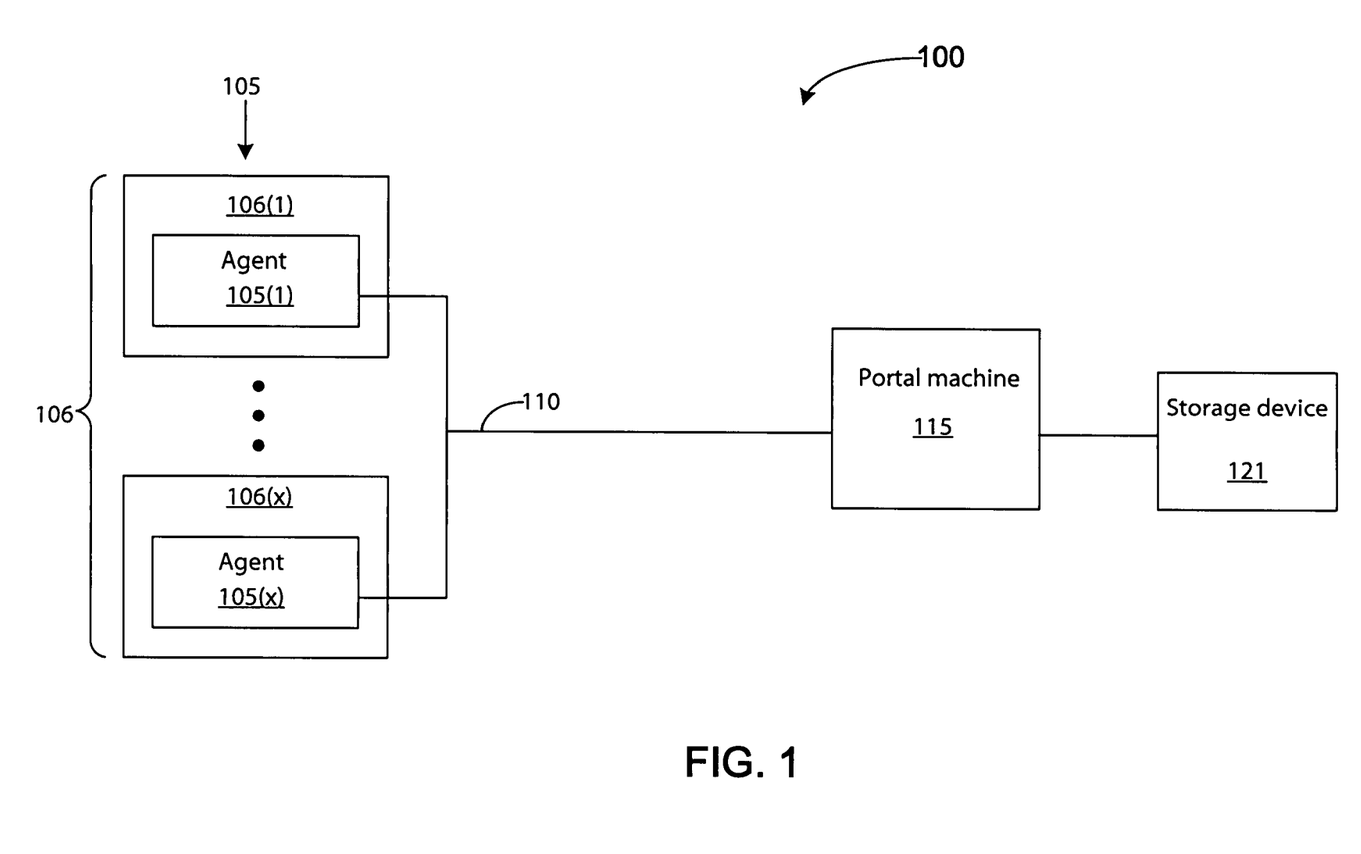
FIG. 1 is block diagram of an apparatus (system), in accordance with an embodiment of the invention.

FIG. 1 is a block diagram of an apparatus (system) 100 in accordance with an embodiment of the invention. One or more agents 105 are connected to a communication network 110. In the example of FIG. 1, agents 105(1) to 105(x) are shown, although the number of agents can vary from one to a plurality of agents. An agent 105 can run on a client machine (generally referred to as client machine 106) such as, for example, a client computer or other suitable types of computing device. In the example of FIG. 1, the agent 105(1) is running on the client machine 106(1). The number of clients in the system 100 can vary. A portal machine 115 is also connected to the network 110. The portal machine 115 can be, for example, a server. A storage device 121 is also coupled to the portal machine 115. The network 110 can be, for example, a wide area network, local area network, or other types of communication networks. The operation of the agent 105 on a client machine and that of the portal machine 115 are discussed in detail below. As discussed further below, an embodiment of the invention provides various advantages such as, for example, the ability to perform a chunking operation for a file (or for an entire backup session) at an agent or at the portal for purposes of achieving load balancing in the system 100 during the backup of files from an agent to a storage device connected to a portal, so that use of resources in the agents are optimized. Other features or advantages in an embodiment of the invention are also discussed below.

Figure 2:
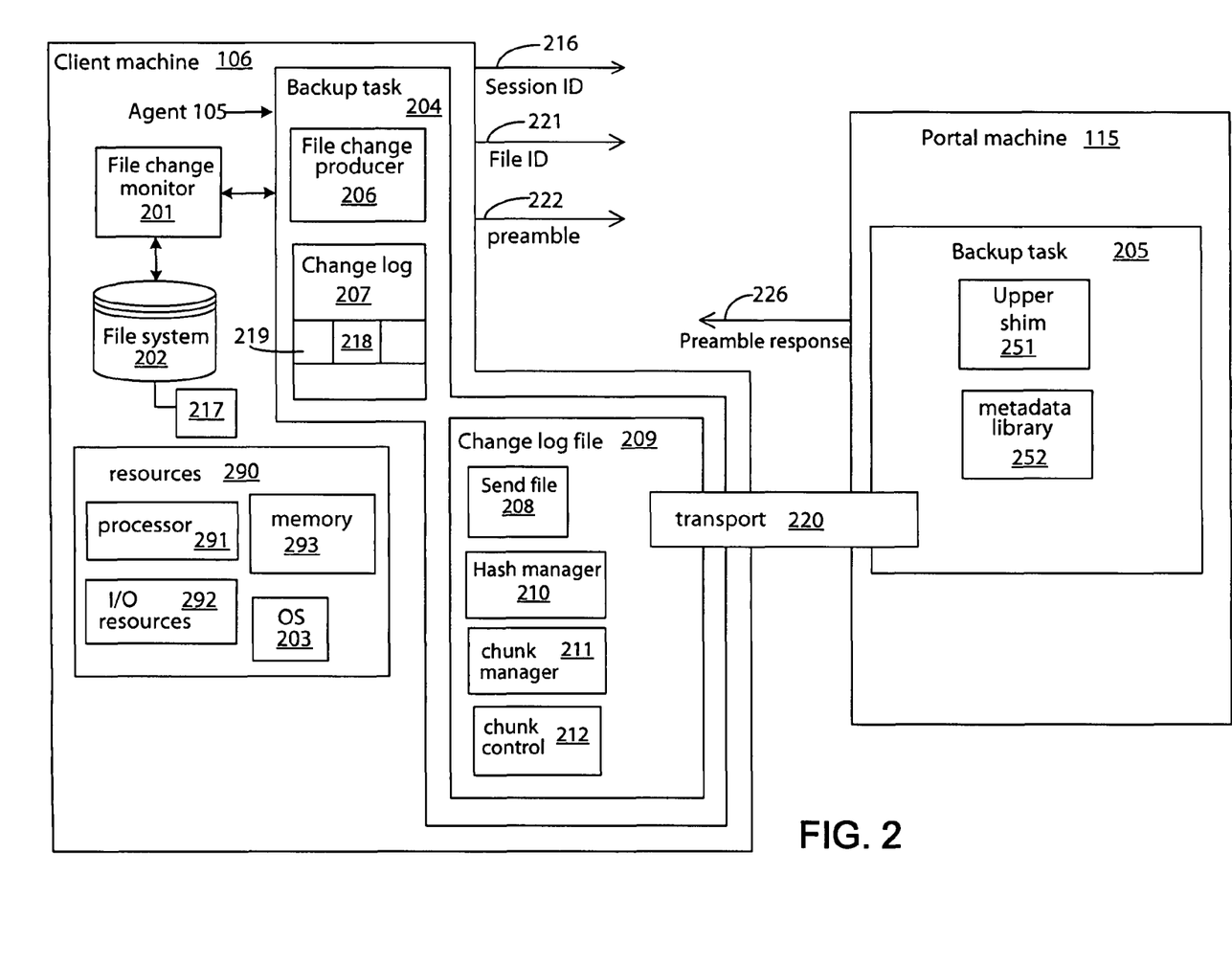
FIG. 2 is a block diagram that shows additional details of a client machine and portal machine, in accordance with an embodiment of the invention.

FIG. 2 is a block diagram that shows additional details of the system 100 of FIG. 1, in accordance with an embodiment of the invention. A file change monitor 201 in a client machine 106 can determine which files in a file system 202 have been modified (i.e., changed, added, or deleted). The file change monitor 201 can be (or perform the function of) a file tree walker (which compares the last modification time of every file in the file system 202 to determine which files have been modified), a file change detector (e.g., a WINDOWS NT® journal) which records the type of operation that is performed on a file, and/or a filter driver (which detects reads and writes on a file). The file change monitor 201 can use other known methods for detecting changes in a file system 201.

To initiate the process of backing up the data from the client 106 to a storage device 121 (FIG. 1) via the portal 115, a command and control architecture would launch a backup task 204 on the client 106 and a backup task 205 on the portal 115. This architecture is implemented by various elements in the client and portal as discussed further below. Typically, the backup task 204 is launched in accordance with a data backup policy that determines when backup operations are to be performed. The data backup policy can be implemented in, for example, a software program. The backup task 205 on the portal 115 is launched by the command and control architecture based on a schedule in the backup policy and there is handshaking involved between the client machine 106 and portal machine 115. The client 106 will initiate all management communication to the portal via a suitable protocol such as, for example SOAP (Simple Object Access Protocol) and the data processing operation is performed via XDP (transmission data protocol) with the features that will be discussed below. The backup tasks 204 and 205 are launched with the same session identifier.

In an embodiment of the invention, the backup task 204 of agent 105 typically launches the following software elements. A file change producer 206 receives the metadata of files that have been modified in the file system 202 since the last backup occurrence. Alternatively, the file change producer 206 will contain or perform the functions of the file change monitor 201. The file change producer 206 places the file name and the associated metadata of a modified file as an entry in a change log 207. The change log 207 contains a list of entries 219 that have metadata of files that have been modified since the last backup. An agent send file thread 208 in a change log consumer 209 reads the metadata and filename for an entry 219 in the change log 207, where the metadata and filename is for a file that has been modified in the file system 202. Typically, multiple send file threads 208 can be implemented in the change log consumer 209 so that the change log consumer 209 can read entries in parallel in the change log 207 as an optimization.

The send file 208, hash manager 210, chunk manager 211, and chunk control 212 are typically software threads in the change log consumer 209. Assume that file 217 is a file that has been modified in the file system 202 since the last backup. The metadata 218 of modified file 217 is placed by the file change producer 206 in an entry 219 in the change log 207. The send file thread 208 reads the metadata 218 in entry 219 of change log 207. The send file 208 can also flag each entry 219 that has been read as being successful or failed to indicate the status of the file backup. The producers remove the entry from the change log 207 as soon as they receive a notification from the change log.

The file 217 also has a client identifier 221 which identifies the file 217 and is typically the identifier (ID) of the row 219 (in change log 219) that contains the metadata 218 of that file 217. The transport 220 of XDP passes the session ID 216 and file ID 221 as part of every call that the transport 220 makes to the portal 110. The transport 220 is responsible for delivering hashes and chunks from the agent 105 in the client 106 to the portal 115, batches the hashes (into hash batches) and chunks (into chunk batches) from various files being computed on the agent, and transports the batches across the network 110 (FIG. 1) to the portal 115. The transport 220 also transmits the communications from the portal 115 to the agent 105. The batching of hashes and chunks produces a pipelining effect that ensures effective utilization of bandwidth between the agent 105 and portal 115. As will be discussed further below, the chunk level and object level single instancing and the load balancing feature (i.e., ability to chunk a file at the agent or at the portal) provides considerable performance improvement over traditional data archiving methods.

The agent backup task 204 and portal backup task 205 are launched with the same session ID 216. Each file 217 that is being backed up is also identified by a specific client ID 221 which is the ID of the row 219 in the changelog database 207 for that file 217 on the client 106. The transport 220 serves as a channel of communication between the client 106 and portal 110 and typically defines commands, messages, and listeners (receiving elements) that are used in a data backup or data restoration procedure. In addition to a backup task 205 that is launched in a portal 115, there is another corresponding portal task created internally that allows the portal stack to be set up for portal chunking as will be discussed below. The stacks for portal chunking and agent chunking are running in parallel.

In an embodiment of the invention, the computation of hashes on a client is optimized by having a preamble phase before performing the computation and transmission of hashes. In the preamble phase, the metadata 218 pertaining to a file 217 to be backed up is sent by the send file component 208 to the portal 115 via preamble 222. If the file was previously backed up, the upper shim layer 251 (that is launched by the portal backup task 205) compares the incoming metadata with the metadata of the previous version of the file existing on the portal to determine if the metadata has changed since the last backup. This is a proof safe way of ensuring that we start the chunking operation only if the file being backed up has really changed and is more recent than the one that has previously been backed up. This is very important in the case of continuous data protection where the file change monitor is continuously capturing changes being done to a file and it is possible that it could report those operations in an incorrect order resulting in lost versions or incorrect latest versions. The preamble response 226 indicates if the metadata 218 has changed since the last backup. The preamble response 226 is sent from the upper shim layer 251 via transport 220 to the send file 208 in the agent 105. If the metadata 218 did not change, then the backup agent 105 running on the client 106 will not start to chunk the file 217 as the contents of a file cannot change without its metadata getting affected. The preamble session in the agent chunking scenario, portal chunking scenario, and no-chunking scenario (whole file transfer from agent to portal) will be discussed below in additional details. By not performing the chunking of file unless the file contents have changed, tremendous cost savings is achieved in the case of an incremental backup. Incremental backup involves transmitting only the deltas (changed data in a file) since the previous backup, instead of transmitting the entire file contents.

Three different cases will now be discussed. These cases involve chunking is not performed for a file, chunking of a file is performed at the client 106, and chunking of a file is performed at the portal 115. By providing the capability to chunk a file either on the agent 105 or on portal 115 (i.e., ability to perform load balancing), an XDP in an embodiment of the invention advantageously prevents the client 106 from getting overwhelmed with the computationally intensive chunking operations that are required for some files. Therefore, the load balancing feature permits improved optimization of the use of resources 290 (FIG. 2) in the client 106 because chunking is not necessarily performed at the client 106 at all times, or if the agent 105 is running on a slower client machine that is not suitable to support the computationally intensive chunking operation. The resources 290 include, for example, processor 291 cycles, disk I/O bandwidth 292, memory resources 293, and OS resources and other software resources 203.

Figure 3:
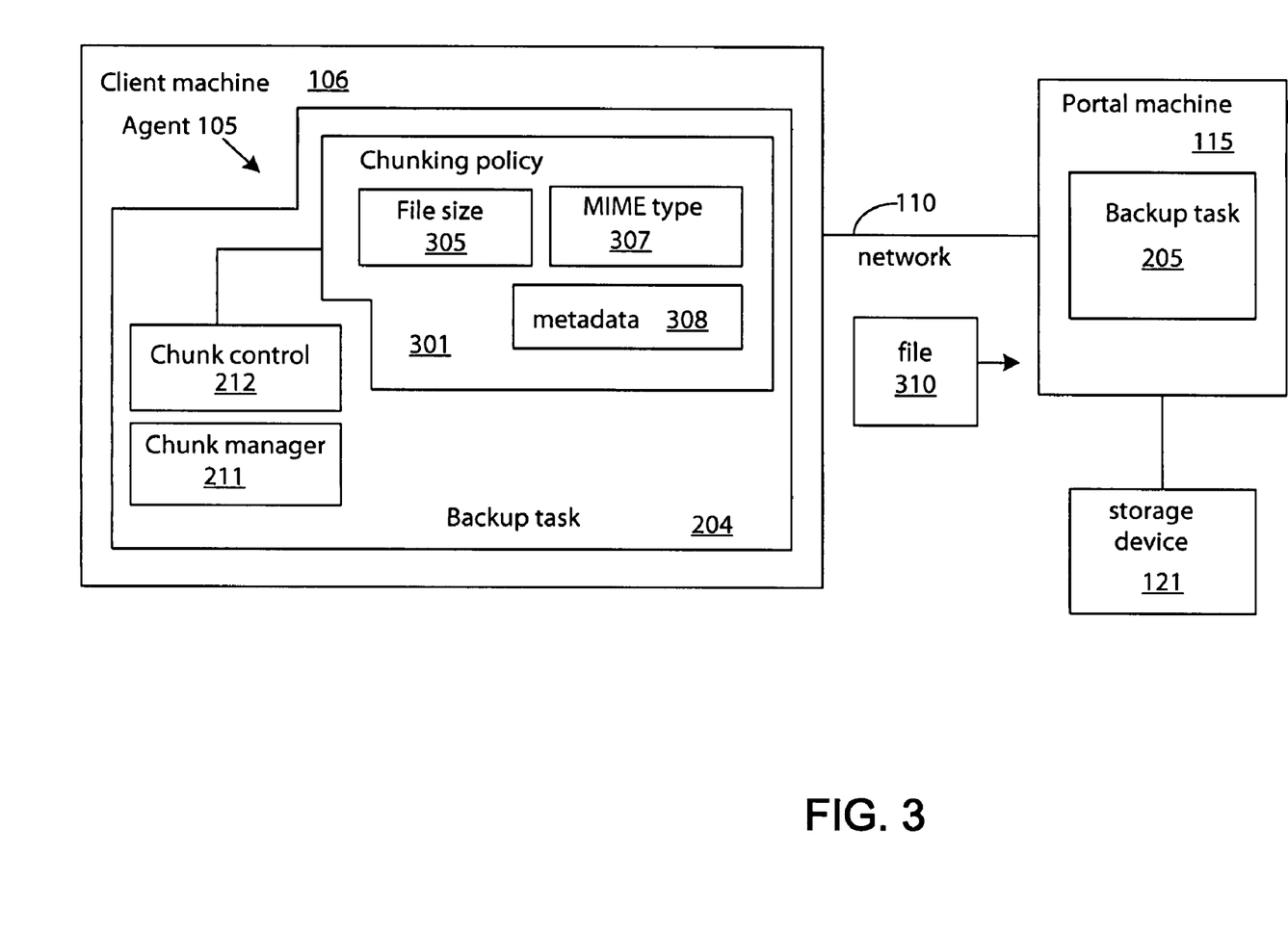
FIG. 3 is a block diagram that shows additional details of a client machine and portal machine, in accordance with an embodiment of the invention.

FIG. 3 is a block diagram that illustrates the components for determining a chunking policy to be applied to a file, as used in an embodiment of the invention. The user can set the chunking policy 301 that is used by the chunk control 212. For example, the user can set a file size threshold 305 on whether a file will be chunked at an agent or portal, or will not be chunked. For example, the policy 301 will indicate that any file 310 that is below a file size threshold 305 will not be chunked and will be transmitted as a whole file from the agent 105 to the portal 115. Assume that this threshold is 100 kilobytes as a specific example. If a file 310 that is less than 100 kilobytes, then the file 310 will not be chunked by the chunk manager 211, and will instead be directly transmitted as a whole file by the agent send file component 208 to the portal 115 using transport. The backup task 205 in the portal 115 will then store the file 310 into the storage device 121 directly by, for example, streaming the file contents. This transmission of the file 310 from the client 106 to the portal 115 is performed after the preamble phase that has been described above, and assumes that the metadata of the file 310 has changed since the last backup occurrence.

The user can set other criteria in the chunking policy 301 such as, for example, MIME type (Multi-Purpose Internet Mail Extensions) 307, or the metadata 308 of the file. For example, the policy 301 will indicate that any file 310 that is a pdf-type file will not be chunked. This restriction on pdf-type files can be set in the chunk control 212. Therefore, if the file 310 is a pdf-type file, then the file 310 will not be chunked by the chunk manager 211, and will instead be directly streamed as a whole file by the backup task 204 to the portal task 205.

As another specific example, larger sized files (e.g., greater than 20 megabyte or other example sizes) are chunked at the agent 105 in client 106, as opposed to performing the chunking operation on the portal. The transmission of these larger sized files across the network will consume more time. By chunking the file in agent, and transmitting the chunks in batches to the portal without waiting for the entire file to be chunked, a pipelining effect is achieved that improves the performance of the backup. In contrast, if a file is less than, e.g., 20 megabyte or other example sizes, the whole file can be transmitted from the agent to the portal and then chunked at the portal 115 as will be discussed below. While this file is being chunked at the portal, other files can be concurrently chunked at the agent 105, and in this case, both backup tasks 204 and 205 are performing chunking of files. Additionally, chunking of smaller sized files does not provide additional performance benefits, and therefore, these files are directly streamed to the portal.

Additionally, chunking is not performed for certain MIME types (e.g., gif images or zip files) because chunking of these compressed files do not provide additional performance benefits, and are instead transmitted as a whole file.

As known to those skilled in the art, chunking algorithms are used for dividing a file into chunks which are portions of the file. A background on chunking algorithms is discussed in, for example, commonly-assigned U.S. Pat. No. 7,269,689. As also known to those skilled in the art, chunking algorithms are also used in Low Bandwidth File Systems (LBFS) in order to divide a file into chunks.

Figure 4:
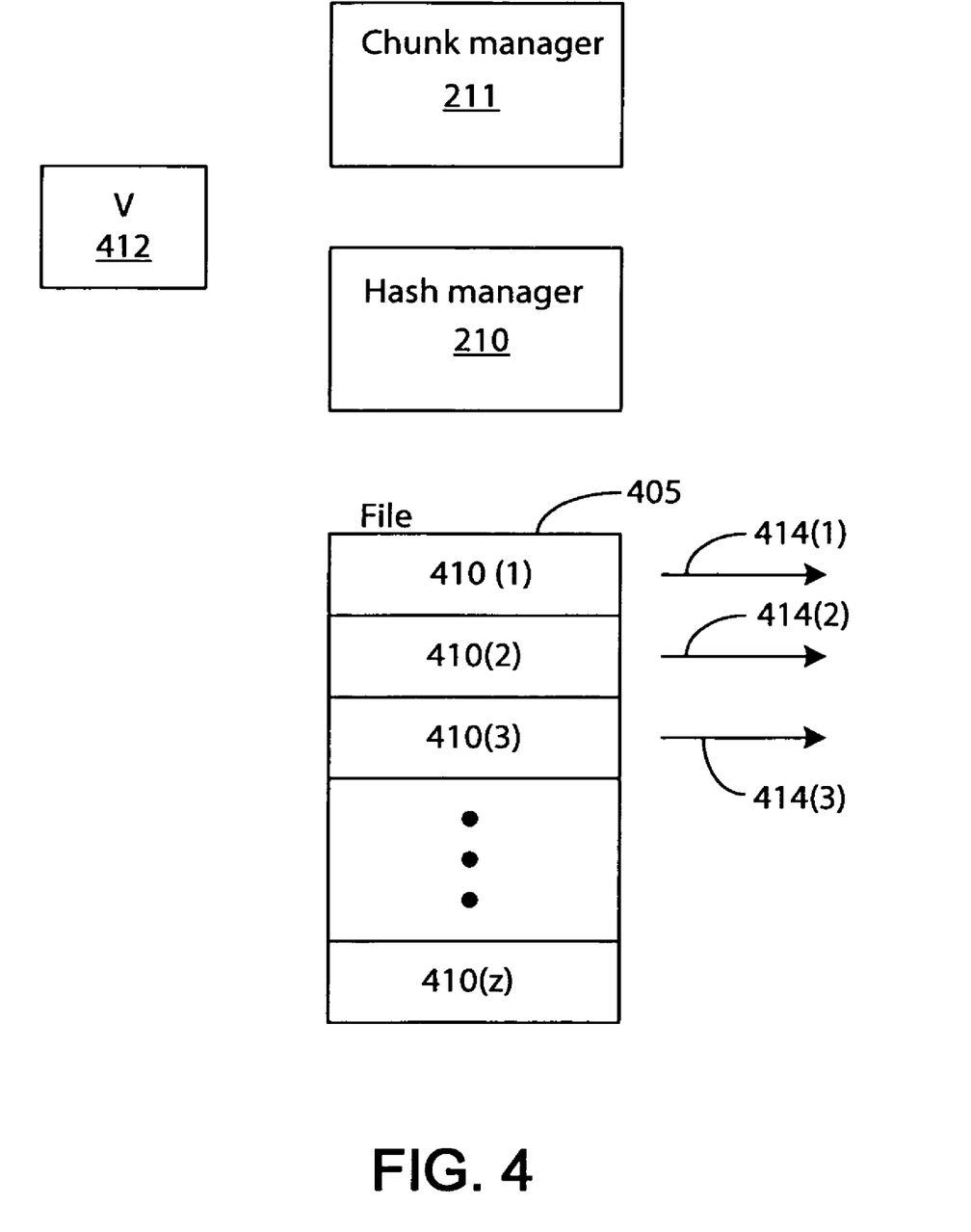
FIG. 4 is a block diagram of chunking and hashing techniques that can be used in an embodiment of the invention.
Figure 10:
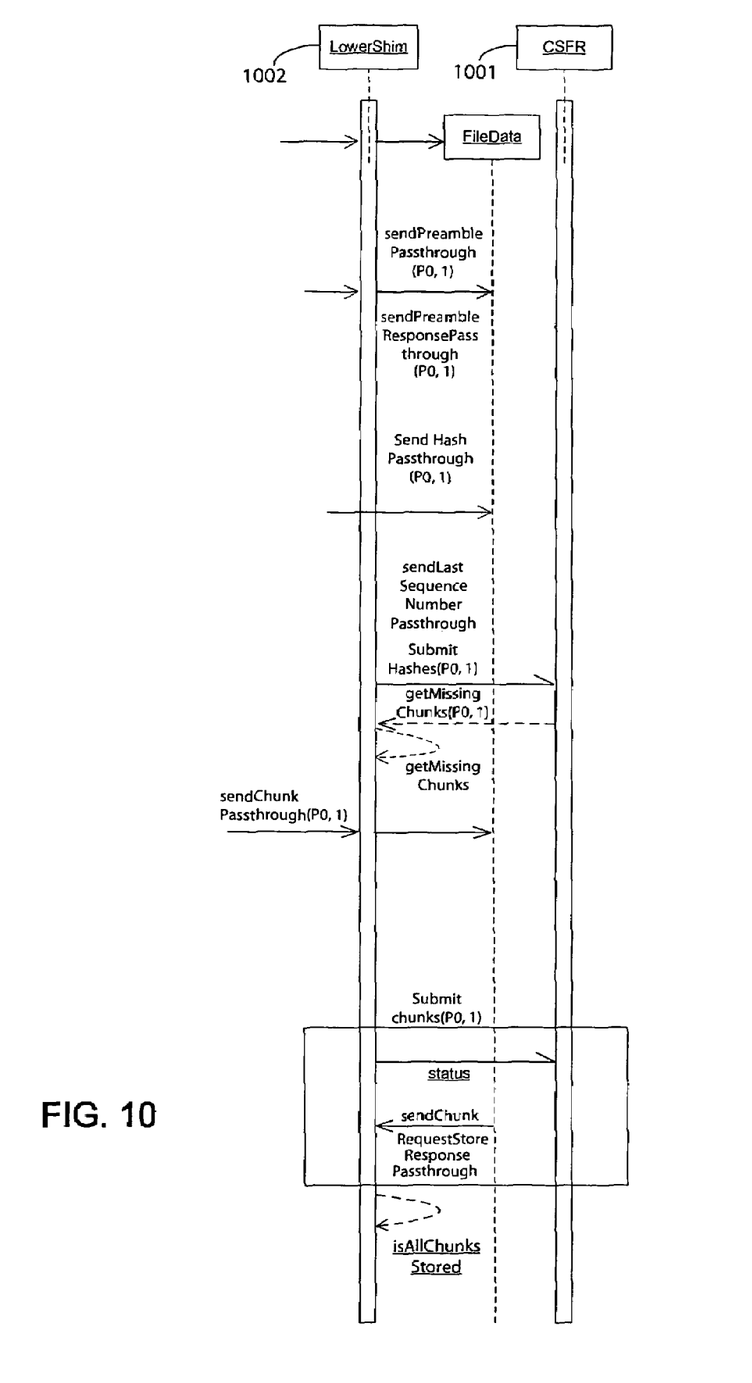
FIG. 10 is a block diagram showing additional elements on the portal side, in accordance with an embodiment of the invention.

As shown in FIG. 4, an embodiment of the invention provides a chunk manager 211 that would chunk a file by use of the fixed chunking algorithm. The chunk manager 211 will chunk the file 405 into the chunks 410(1) to 410(Z) where the size of the file will determine the value of Z. In an embodiment of the invention, a minimal set of chunks in a file are first obtained and a hash manager 212 will calculate corresponding hash values for this minimal set of chunks in the file 405. This minimal set can be set by a programmable threshold value 412. As an example, assume that file 405 (FIG. 4) will be backed up. Initially, the metadata of the file 405 is sent to the portal during the preamble phase and it is determined if the metadata has changed since the last backup. If the metadata has changed as indicated by the preamble response, then one of the three scenarios can occur: agent chunking, portal chunking, or no chunking, as will be discussed in additional details below. In an agent chunking scenario, the first minimal set of chunks of the file is first obtained (e.g., one-hundred chunks per set). The hashes for these one-hundred chunks in this minimal set is sent to the portal without waiting for the chunking to finish for the next one-hundred chunks of the file. As a result, the first one-hundred hash values of the first one-hundred chunks are being compared in the portal side. In the case of files being backed up for the first time and which do not have any previous versions on the portal resemblance detection can be performed rather quickly. In the transmitted first-one hundred hash values, a resemblance detection heuristic method is performed where a subset of the hashes (e.g., first 10 hashes) in the first one-hundred hash values is compared with a subset of hash values (e.g., first 10 hashes) of first 10 chunks of stored files on the portal side. The content repository 1001 (FIG. 10) can perform this comparison of hash values in the resemblance detection heuristic method. Assume that a stored file (candidate file) on a portal side was found to match the file 405 in the first 10 chunks. Hash comparison between the rest of the chunks in the stored file and file 405 are made, and only the chunks of non-matching hashes of the file 405 are sent to the portal. As an achieved benefit, the chunks of the matching hash values will not be transmitted from the agent to the portal. By performing chunk level single instancing on the portal side, the backup time is advantageously reduced. Additionally, in the case of whole file backup, where chunking the file does not provide any added benefit, a hash value is computed for the contents of the entire file. This hash value is sent as part of the metadata during the preamble phase. The whole file is not transmitted from the agent to the portal if a hash match is determined on the portal side. This is called Whole File Single Instancing.

By first chunking and hashing a minimal set of chunks, the XDP protocol in an embodiment of the invention allows the hash comparison to be performed, typically at the storage device 121, without the need to wait for the entire file 405 to be chunked. Compare-by-hash algorithms are known to those skilled in the art. When a minimal set of chunks have been produced by the chunking process (as set in the configuration parameter 412), a hash value can be generated for each of the minimal set of chunks and the portal can then request the agent 105 for missing chunks while the chunking of the remaining portion of file 405 is still in progress. The hashes and requested chunks are transmitted to the portal in one or more batches until the modified chunks of the file 405 is backed up and versioned via portal 115 at the storage device 121.

An embodiment of the invention also permits multiple files to be chunked by the chunk manager 211 in parallel on the agent 105, while the send file 208 (FIG. 2) sends hashes to the portal 115 so that the portal 115 is able to request for and receive the missing chunks based on the hash comparison. This parallel operation of chunking and hash comparison and missing chunks transmission to the portal provides a pipelining effect that improves data transfer by an embodiment of the XDP protocol.

In another embodiment of the invention, the transmission of the requested chunks are interleaved between the previous batch of hashes that were submitted by the agent 105 to portal 115 and the next batch of hashes to be submitted by the agent 105 to portal 115. This interleaving between the requested chunks and batches of hashes takes advantages of available idle time when transmission across the network 110 would otherwise not be occurring. The transport 220 can accumulate the hashes in batch and the missing chunks in batch and also interleave the transmission of missing chunks between transmissions of hash batches.

As a simplified example, assume that the hash manager 210 calculates the hash values 414(1) to 414(3) for chunks 410(1) to 410(3), respectively. Assume also that the preamble phase has indicated that the file 405 has been modified since the last backup. Hash values can be calculated by a hash algorithm such as, for example, MD5 or a Secure Hash Algorithm (SHA) such as, for example, SHA1 or SHA256. The send file component 208 in backup task 204 will then send the hashes 414(1) to 413(3) to the portal 115. The agent 105 can be optionally optimized so that the transport 220 accumulates a given number of hashes so that the send file 208 can send the hashes in batches. A lower shim layer in the portal 115 can compare the received hashes 414(1)-414(3) with stored hashes which are mapped to stored chunks in the storage device 121, for the specific file 405 in question. The stored hashes (and/or mapping of the hashes to chunks) can be, for example, in a hash database in the storage device. As discussed below, different files can optionally share the same chunks in the storage device 121.

Figure 5:
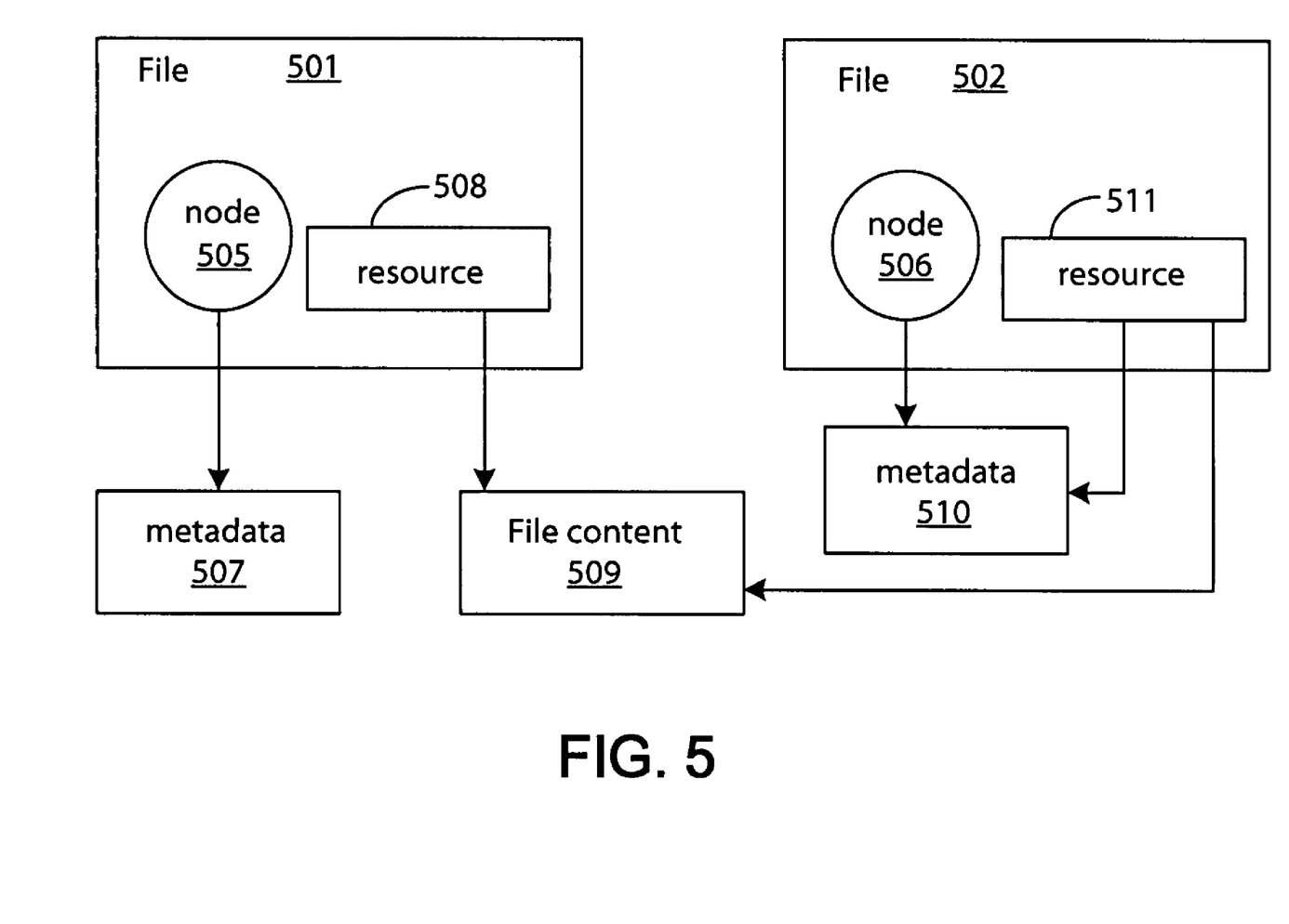
FIG. 5 is a block diagram of a resource sharing technique, in accordance with an embodiment of the invention.

FIG. 5 is a block diagram of resource sharing that can be used by versions of a file, in an embodiment of the invention. This resource sharing method is used in the storage device 121 (FIG. 1). A file 501 contains a node 505 that points to the metadata 507 of the file 501 and has a resource 508 that points to the chunks 509 that contain the content of the file 501. The file 502 has a node 506 that points to the metadata 510 of the file 502. If the file 502 has the same contents as file 501, then the resource 511 of file 502 will point to the same chunks 509 as shown in FIG. 5.

Chunks can be shared across different versions of a file and shared across different files. If two files are mostly identical in chunks and if one of the files has already been backed up on the storage server 121 (FIG. 1), then the agent 105 need to only send to the portal 115 the differing chunks for the second file.

Figure 6:
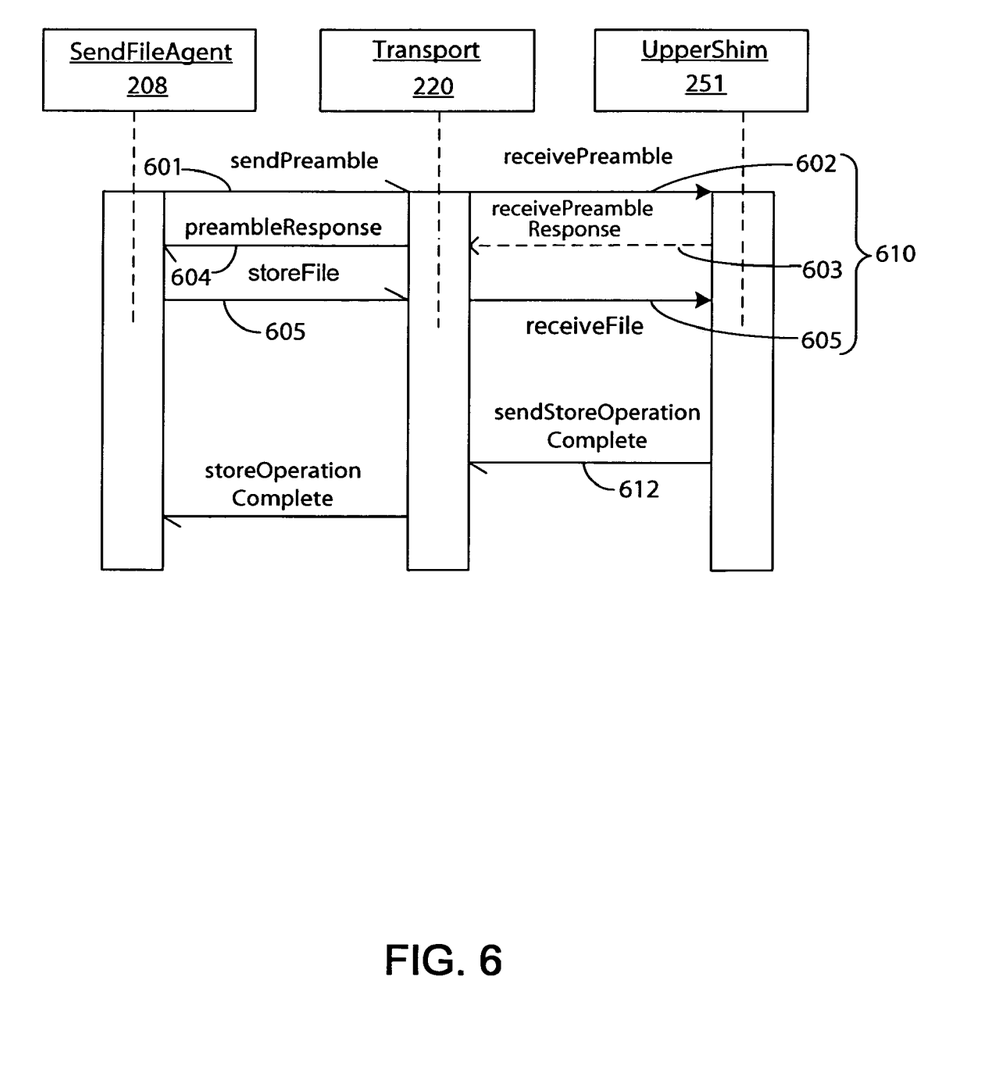
FIG. 6 is a block diagram of a whole file transfer scenario, in accordance with an embodiment of the invention.

FIG. 6 is a block diagram that illustrates the functionality of the agent send file component 208, transport 220 and upper shim 251 when a whole file is transferred from the agent 105 to the portal 115, in an embodiment of the invention. In an embodiment of the invention, the XDP protocol from the agent's 105 perspective is the same for both the no-chunking case and the portal chunking case, except for the time line (time value) when the file stored completion message reaches the agent from the portal. The agent send file 208 will send, via transport 220 portion on the agent 105, the sendPreamble call 601 which contains the metadata pertaining to a file to be backed up, as discussed above. The transport 220 portion on the portal 115 will then send the receivepreamble call 602 to the upper shim layer 251 which checks if the metadata in the sendPreamble call 601 has changed since the last backup. The sendPreamble response 603 indicates if the metadata has changed since the last backup. The transport 220 forwards the call 603 as a preambleResponse 604 to the agent send file 208.

If the metadata has changed, then the agent send file 208 sends the whole file via storefile call 605 which is forwarded by the transport 220 as receiveFile call 605 to the upper shim 251. The whole file is sent by the upper shim 251 to lower shim 1002 and eventually streamed as a set of bytes to a content repository 1001, and the file contents are stored into storage device 121.

Figure 7:
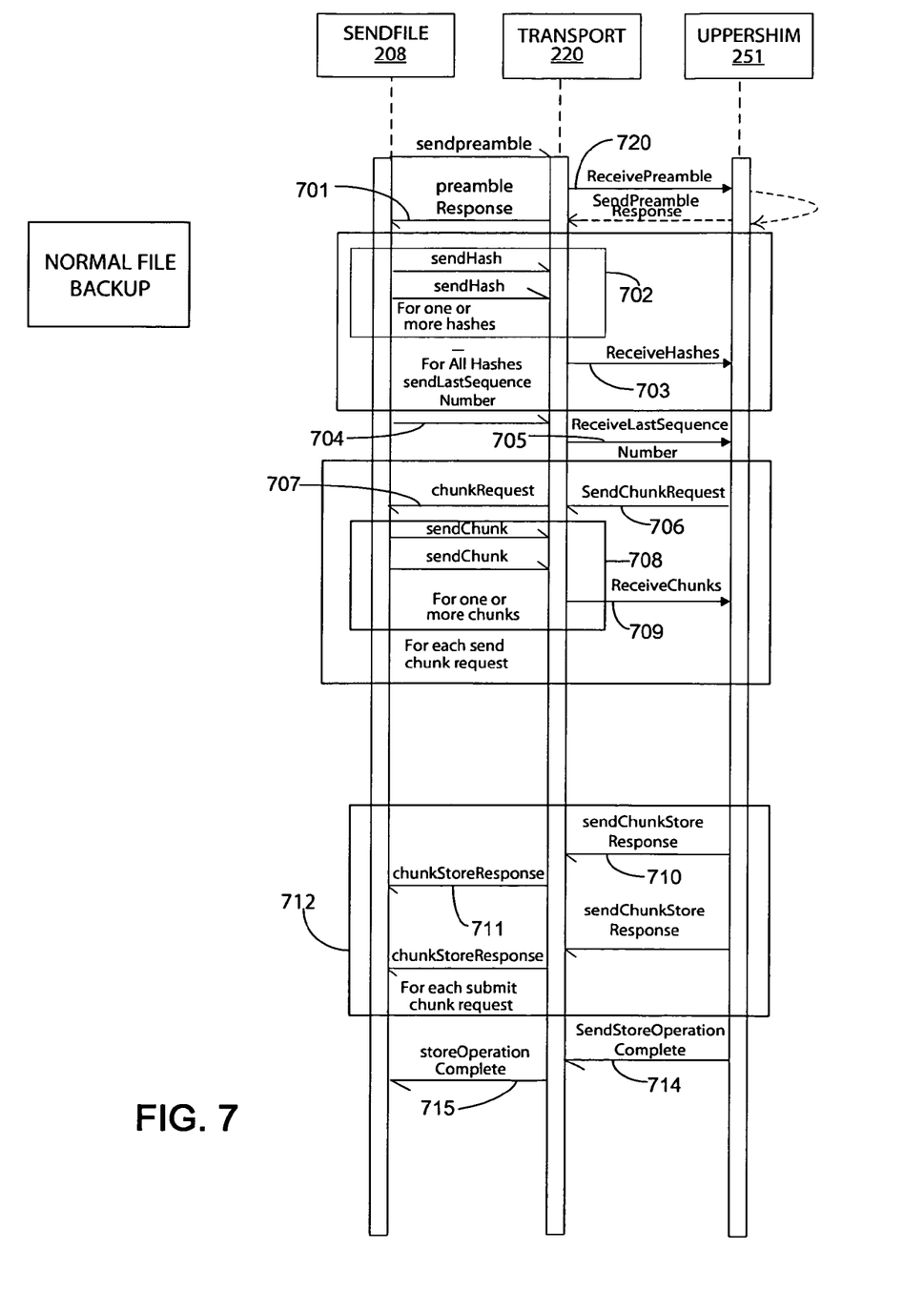
FIG. 7 is a block diagram of an agent chucking scenario, in accordance with an embodiment of the invention.

FIG. 7 is a block diagram that illustrates the functionality of the agent send file component 208, transport 220 and upper shim 251 when a chunking of a file is performed on the agent 105, in an embodiment of the invention. The various calls in the preamble phase (sendpreamble, receivepreamble, sendPreambleResponse, and preambleResponse) have been discussed above. If the metadata of a file has changed, as will be indicated by the preamble response 701 to the agent send file component 208, then the chunk manager 211 will perform chunking of the file and hash manager 210 will calculate hash values of the chunks, as has been discussed above. In an embodiment of the invention, the features of the chunk manager and hash manager can be integrated with or be separate from the agent send file component 208. The sendHash calls 702 from the send file 208 to the transport 220 will send the hash values to the transport. The transport then batches the hashes and sends the hash batch via receiveHashes call 703 to the portal, and the receivehashes call 703 from the transport 220 to upper shim 251 results in the hash comparisons as discussed above. The send file 208 sends the sendLastSequenceNumber call 704 to the transport 220 when the last hash for the entire file has been sent by the send file 208 to the transport 220. The transport 220 sends the receiveLastSequenceNumber call 705 to the upper shim 251 to indicate that the last hash for the file has been sent from the agent 205 to portal 115.

Based on the hash comparisons, the upper shim 251 sends a sendChunkRequest call 706 listing the hashes, for each batch of hashes that were submitted to the portal from the agent 105, for chunks whose hash values do not match any stored hashes in the Hash chunk database on the portal 115 side for the file in question (e.g., stored hashes in a database in the storage device 121 or in the portal 115 itself). The transport 220 forwards the call 706 as a chunkRequest 707 to the send file 208. In response to each chunkRequest 707, the send file 208 will send all chunks 708 as requested in the chunkRequest 707. The transport 220 will send the chunks 708 via the receive chunks call 709 to the upper shim 251.

The chunks 708 are then eventually forwarded by the upper shim 251 to lower shim 1002 and then streamed to the content repository 1001 and then stored in the storage device 121. An example of the content repository 1001 is in the RISS products from HEWLETT-PACKARD COMPANY. For each batch of chunks, submitted by send file to the portal, that is stored in the storage device 121, the upper shim 251 sends a sendChunkStoreResponse 710 to the transport 220 which then forwards this call 710 as a chunkStoreResponse 711 to the send file 208, in order to confirm that the chunks has been successfully stored on the portal 115 side (e.g., in storage device 121). The calls 710 and 711 can be transmitted in a batch 712. When all of the chunks sent from the agent 105 to portal 115 have been stored on the portal side, then the upper shim 251 will send a sendstoreopertioncomplete call 714 which is forwarded by the transport 220 as a storeOperationComplete call 715 to the send file 208. The call 715 is a confirmation message to the send file 208 in order to confirm that the backing of the file on the portal side is complete As similarly discussed above, the sending of hash batches via sendHash calls 702 and sending of chunks batches via sendChunk calls 708 can be performed asynchronously and transmission of a chunk batch can also be interleaved between the transmission of hash batches.

Figure 8:
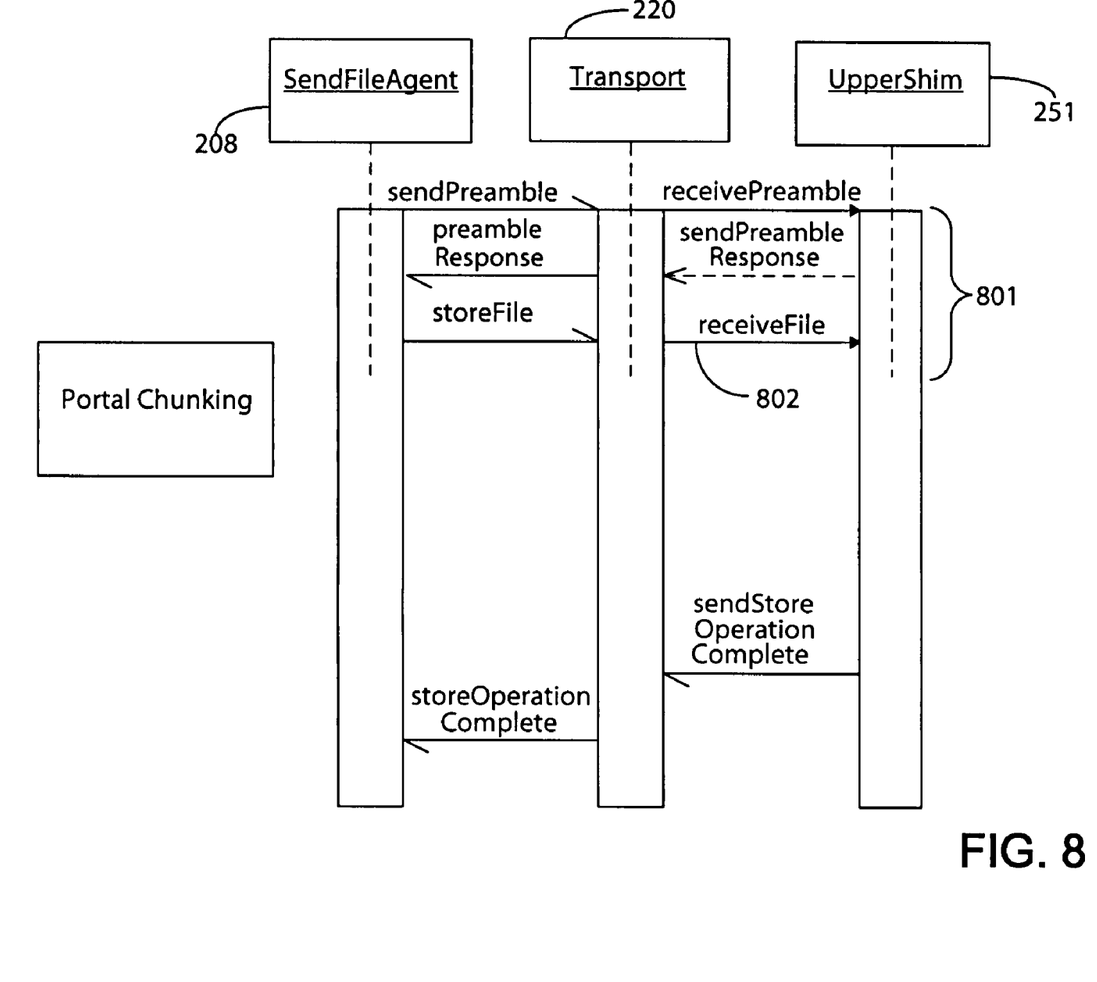
FIG. 8 is a block diagram of a portal chucking scenario, in accordance with an embodiment of the invention.

FIG. 8 is a block diagram that illustrates the functionality of the agent send file component 208, transport 220 and upper shim 251 when chunking of a file is performed on the portal 116. As mentioned above, in an embodiment of the invention, the XDP protocol from the agent's 105 perspective is the same for both the no-chunking case and the portal chunking case, except for the time line (time value) when the file stored completion message reaches the agent from the portal. Therefore, the calls in the preamble phase 801 in the portal chunking case is similar to the calls in the preamble phase 610 (FIG. 6) in the whole file transfer case. However, the time occurrence between the receivefile call 802 and sendStoreOperationComplete 803 (which confirms successful storage on the portal 115 side of all transmitted chunks) in the portal chunking case is longer than the time occurrence between the receivefile call 605 and sendStoreOperationComplete call 612 in the whole file transfer case because the process of portal chunking will occur in the portal 115 between call 802 and call 803.

Figure 9A:
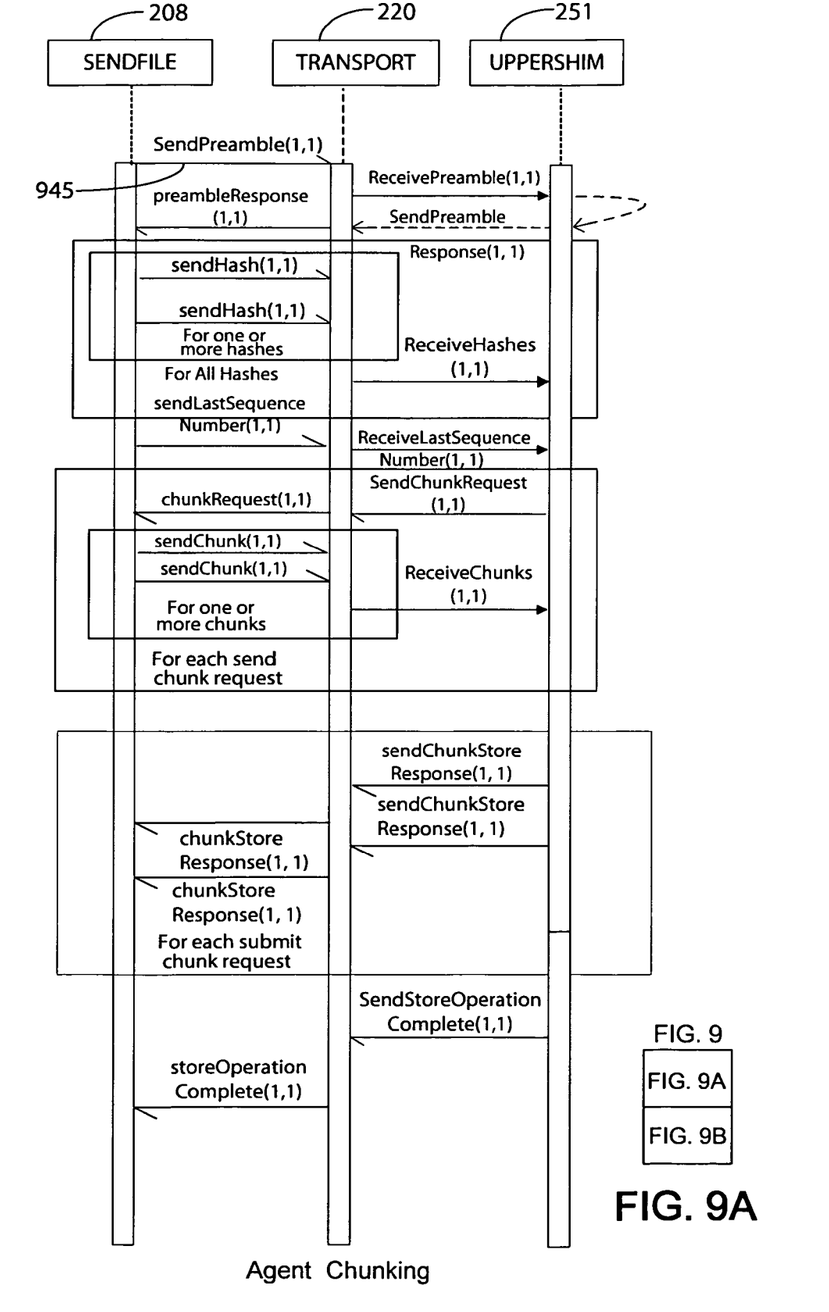
FIG. 9 is a block diagram of illustrating additional details of the portal chucking scenario, in accordance with an embodiment of the invention.
Figure 9B:
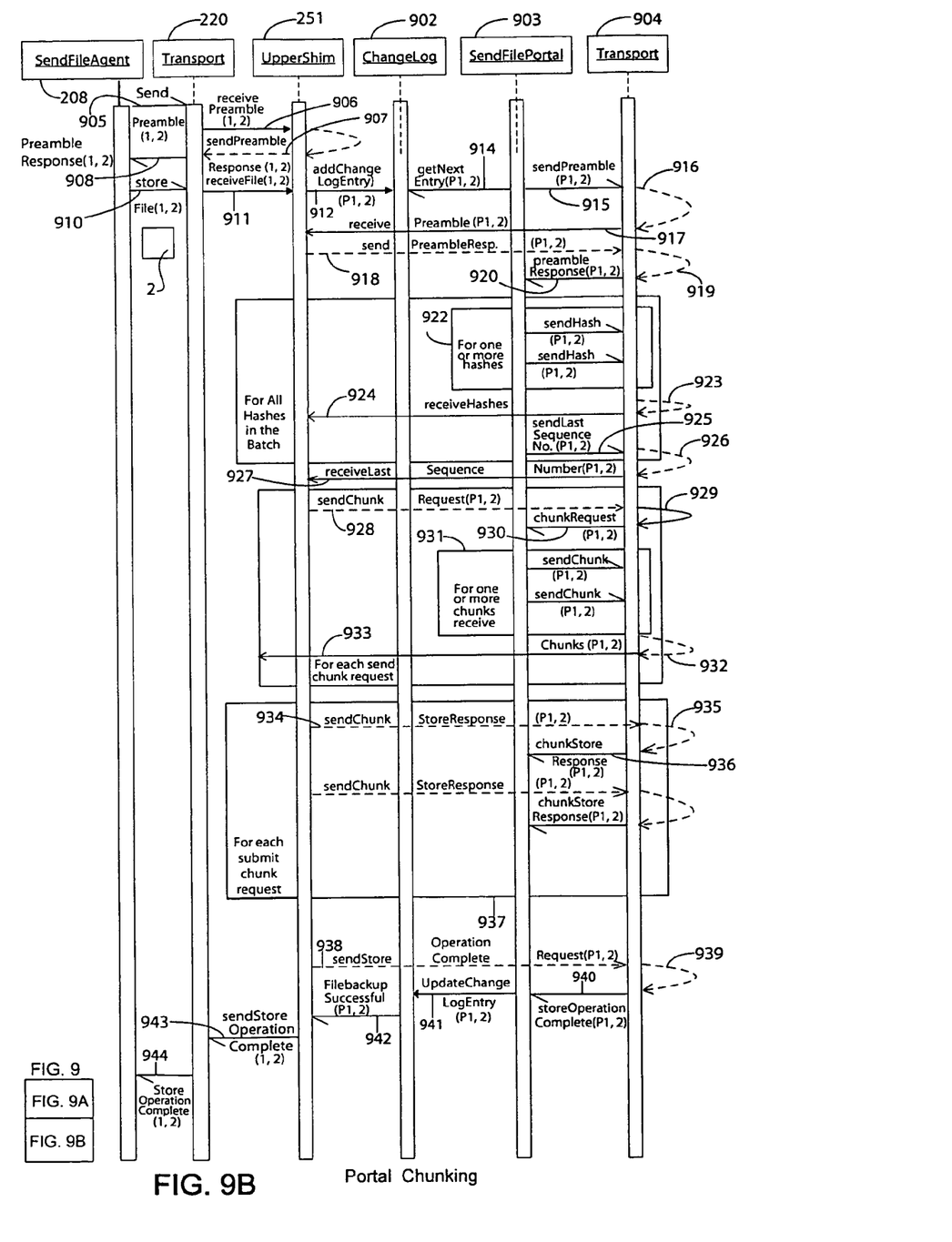

FIG. 9 is a block diagram that illustrates additional details of a portal chunking scenario in accordance with an embodiment of the invention. For convenience, the previously discussed details of the agent chunking scenario of FIG. 7 is also shown on the left side of FIG. 9 to assist in describing the portal chunking scenario. In the portal chunking scenario, an entire file will be sent from the agent 105 to the portal 115 as discussed above. A preamble phase is performed where the agent send file 208 sends the sendPreamble (1,2) call 905 to the transport 220 which forwards the call 905 as receivePreamble (1,2) call 906. The notation (1,2) for calls 905 and 906 means (backup session 1, client (file) ID 2). Hence, notation (1,2) means that the call is using a backup session ID 1 and the file 2 is involved in the call. The sendPreambleResponse (1,2) call 907 and preambleResponse (1,2) call 908 indicates if there is a metadata mismatch on the portal 115 side for the metadata of the file 2. If the file ID 2 metadata does not match with metadata on the portal side, then the file 2 needs to be backed up on the portal side. The agent send file 208 makes the storeFile (1,2) call 910 to the transport 220 to transmit the file 2, and the transport 220 forwards the call 910 as receiveFile (1,2) call 911 to the upper shim 251. The upper shim 251 sends a ChangeLogEntry (P1,2) call 912 to the change log 902, and this call 912 will insert the metadata of file 2 into an entry in change log database 902. Therefore, the upper shim 251 is acting in similar to the file change producer 206 (FIG. 2) which is inserting a metadata of a file into the change log 207. The parameter P1 means that the call 912 is using a second backup session (with ID P1) which is a different session from the backup session 1. The backup session 1 launches the upper shim 251 and front end transport 220, while the portal backup session P1 launches the changelog 207, changelog consumer 209 and proxy transport 904 on the portal.

The portal send file component 903 makes the getNextEntry (P1,2) call 914 to the change log database 902 in order to process the entry with the metadata of file 2. The portal send file component 903 then begins a portal preamble phase which involves the following calls. The portal send file component 903 sends a sendPreamble (P1,2) call 915 (which uses the portal session P1 and which has the metadata for file 2). A proxy transport 904 will pass through (e.g., perform a "U-turn") on the call 915, so that the call 915 is passed by the proxy transport 904 as receivePreamble (P1,2) to the upper shim 251. The upper shim 251 then sends a sendPreambleResponse (P1,2) call 918 In a similar manner as discussed above, in the agent chunking scenario, the upper shim 251 would receive a receivepreamble call 720 (FIG. 7) and send a sendPReambleResposnse call 721 during the preamble phase.

The proxy transport 904 would pass the call 918 as a preambleResponse (P1,2) call 920 to the portal send file 903. In response to call 920, the portal send file 903 would call (or perform) a chunk manager 211 function to chunk the file 2, as similarly discussed in FIG. 4 and would call (or perform) a hash manager function 210 to calculate hash values for chunks in the file 2. A threshold value 412 (FIG. 4) can also be set so that only the first few chunks of a file are chunked and hashed at a time.

The portal send file 903 sends the hashes via sendHash (P1,2) calls 922 which are passed 923 by proxy transport 904 as a call 924 the upper shim 251. The call 925 is passed 926 by the transport 904 as call 927 to upper shim 251 to indicate that all hashes in the entire file have been transmitted by the portal send file 903.

Based on the hash comparisons, the upper shim 251 sends a sendChunkRequest (P1,2) call 928 which is passed 929 to the portal sendfile 903. The sendChunkRequest (P1,2) call 928 is for chunks of hashes from the submitted batch where the hashes are not stored on the portal side. The transport 904 passes 929 the call 928 as a chunkRequest (P1,2) call 930 to send file 903. In response to each call 930, the send file 903 will send all chunks 931 as requested in call 930. The chucks are forwarded by the portal send file 903 to the lower shim 1002 and then to the content repository 1001 and then stored in the storage device 121.

The upper shim passes the chunks to the lower shim 1002 and the chunks are then forwarded to the content repository 1001 and then stored in the storage device 121. The transport 904 will pass 932 the chunks as receiveChunks (P1,2) call 933 to the upper shim 251, and this call 933 delivers the chunks.

For a batch of chunks that is stored in the storage device 121, the upper shim 251 sends a sendChunkStoreResponse (P1,2) call 934 to the transport 904 which passes 935 the call 934 as call 936 to the portal send file 903. The calls 934 and 936 can be transmitted in a batch 937. The upper shim 251 sends a sendstoreopertioncomplete (P1,2) call 938 which is passed by the transport 904 as call 940 to the send file 904 to confirm that the file has been stored on the portal side. The send file 903 also updates 941 the change log database 902 to remove the entry for portal session P1 and file 2, i.e., the parameter (P1,2). The calls 942-944 are performed so that the agent send file component 208 receives confirmation of the successful backup of the file 2.

Note in FIG. 9 for the agent chunking scenario on the left side of the drawing, the parameter (1,1) is added to each call such as, for example, sendPreamble (1,1) call 945. All calls in the agent chunking scenario were previously discussed above with reference to FIG. 7. The parameter (1,1) means that the call is using backup session 1 for a different file 1. Since sessions 1 and P1 can be occurring concurrently, an embodiment of the invention advantageously permits the agent chunking of file 1 (via backup session 1) and portal chunking of file 2 (via backup session P1) to occur concurrently or asynchronously.

It is also within the scope of the present invention to implement a program or code that can be stored in a machine-readable or computer-readable medium to permit a computer to perform any of the inventive techniques described above, or a program or code that can be stored in an article of manufacture that includes a computer readable medium on which computer-readable instructions for carrying out embodiments of the inventive techniques are stored. Other variations and modifications of the above-described embodiments and methods are possible in light of the teaching discussed herein.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for a backup procedure with transparent load balancing, the method comprising:
    performing a preamble phase to determine if a first file is to be backed up from an agent machine to a portal; and
    in response to the preamble phase indicating that the first file is to be backed up, selecting, based on at least one criterion, which of a plurality of chunking policies to apply to the first file, the plurality of chunking policies including performing chunking of the first file on the agent machine, performing chunking of the first file on the portal, and transmitting the first file to the portal without chunking;
    applying the selected chunking policy on the first file; and
    in response to selecting the chunking policy specifying that chunking of the first file is to be performed on the agent machine, calculating hash values for chunks of the first file and determining, based on a comparison of the hash values to hash values at the portal, chunks that are to be transmitted to the portal.

2. The method of claim 1, wherein calculating the hash values comprises calculating the hash values for a minimal set of chunks in the first file.

3. The method of claim 2, further comprising:
    comparing a subset of the hash values for the minimal set of chunks to hash values at the portal to identify a candidate file for comparison with the first file.

4. The method of claim 1, further comprising:
    in response to selecting the chunking policy specifying that chunking of the first file is to be performed on the agent machine, transmitting the calculated hash values in a batch to the portal.

5. The method of claim 1, further comprising:
    transmitting chunks in a batch to the portal.

6. The method of claim 1, wherein chunks of the first file associated with hash values that do not match hash values at the portal are transmitted to the portal.

7. The method of claim 1, further comprising:
    in response to selecting the chunking policy specifying that the chunking of the first file is to be performed on the portal, transmitting the first file to the portal to cause the portal to perform chunking on the first file.

8. The method of claim 7, further comprising:
    performing chunking of a second file on the agent machine while chunking of the first file is performed on the portal.

9. The method of claim 1, wherein the selecting comprises:
    in response to a first criterion being satisfied, the agent machine selecting the chunking policy that specifies that chunking is to be performed on the agent machine; and
    in response to a second, different criterion being satisfied, the agent machine selecting a second of the chunking policies that specifies that chunking is to be performed on the portal.

10. The method of claim 9, wherein the selecting further comprises:
    in response to detecting that the first file has a size below a predefined threshold, the agent machine selecting a third of the chunking policies that specifies that chunking is not to be performed.

11. The method of claim 1, wherein the preamble phase comprises sending, by the agent machine, metadata of the first file to the portal, and receiving, by the agent machine, a response indicating whether the metadata of the first file has changed since a previous backup operation.

12. An apparatus for a backup procedure with transparent load balancing, the apparatus comprising:
    an agent machine configured to perform a preamble phase to determine if a first file is to be backed up from the agent machine to a portal; and
    wherein the agent machine is to further:
        in response to the preamble phase indicating that the first file is to be backed up, select, based on at least one criterion, which of a plurality of chunking policies to apply to the first file, the plurality of chunking policies including performing chunking of the first file on the agent machine, performing chunking of the first file on the portal, and transmitting the first file to the portal without chunking;
        apply the selected chunking policy on the first file; and
        in response to selecting the chunking policy specifying that chunking of the first file is to be performed on the agent machine, calculate hash values for chunks of the first file and determine, based on comparing the hash values to hash values at the portal, chunks that are to be transmitted to the portal.

13. The apparatus of claim 12, wherein the calculated hash values are for a minimal set of chunks in the first file.

14. The apparatus of claim 12, wherein the agent machine is to, in response to selecting the chunking policy specifying that chunking of the first file is to be performed on the agent machine, transmit hash values in a batch to the portal.

15. The apparatus of claim 12, wherein the agent machine is to transmit chunks in a batch to the portal.

16. The apparatus of claim 10, wherein chunks associated with hash values that do not match hash values on the portal are to be transmitted to the portal.

17. The apparatus of claim 12, wherein the agent machine is to perform the selecting by:
    in response to a first criterion being satisfied, selecting the chunking policy that specifies that chunking is to be performed on the agent machine; and
    in response to a second, different criterion being satisfied, selecting a second of the chunking policies that specifies that chunking is to be performed on the portal.

18. The apparatus of claim 17, wherein the agent machine is to perform the selecting by further:
    in response to detecting that the first file has a size below a predefined threshold, selecting a third of the chunking policies that specifies that chunking is not to be performed.

19. An article of manufacture, comprising:
    a non-transitory machine-readable medium having stored thereon instructions to:
    perform a preamble phase to determine if a first file is to be backed up from an agent machine to a portal; and in response to the preamble phase indicating that the first file is to be backed up, select, based on at least one criterion, which of a plurality of chunking policies to apply to the first file, the plurality of chunking policies including performing chunking of the first file on the agent machine, performing chunking of the first file on the portal, and transmitting the first file to the portal without chunking;

apply the selected chunking policy on the first file; and in response to selecting the chunking policy specifying that chunking of the first file is to be performed on the agent machine, calculate hash values for chunks of the first file and determine, based on comparing the hash values to hash values at the portal, chunks that are to be transmitted to the portal.

20. The article of claim 19, wherein the selecting comprises:

in response to a first criterion being satisfied, selecting the chunking policy that specifies that chunking is to be performed on the agent machine; and in response to a second, different criterion being satisfied, selecting a second of the chunking policies that specifies that chunking needs to be performed on the portal.

21. The article of claim 20, wherein the selecting further comprises:

in response to detecting that the first file has a size below a predefined threshold, selecting a third of the chunking policies that specifies that chunking is not to be performed.

* * * * *

UNITED STATES PATENT AND TRADEMARK OFFICE
CERTIFICATE OF CORRECTION

PATENT NO. : 8,375,396 B2  
APPLICATION NO. : 12/012291  
DATED : February 12, 2013  
INVENTOR(S) : Subramaniyam V. Pooni et al.

Page 1 of 1

It is certified that error appears in the above-identified patent and that said Letters Patent is hereby corrected as shown below:

In the Claims:

In column 12, line 46, in Claim 16, delete "claim 10," and insert -- claim 12, --, therefor.

Signed and Sealed this  
Fourteenth Day of May, 2013

Teresa Stanek Rea  
*Acting Director of the United States Patent and Trademark Office*